UNITED STATES PATENT OFFICE.

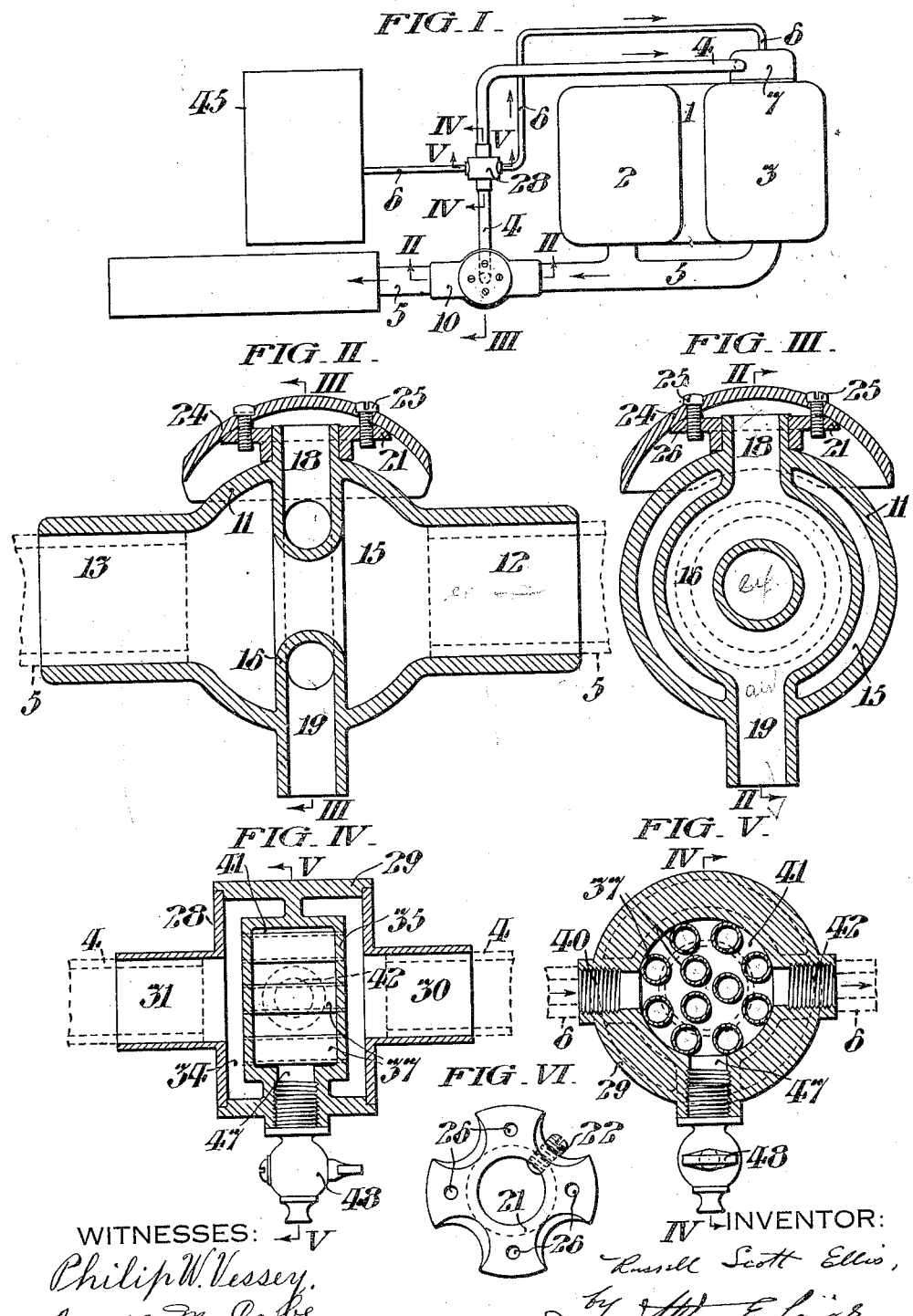

RUSSELL SCOTT ELLIS, OF PHILADELPHIA, PENNSYLVANIA.

INTERNAL-COMBUSTION ENGINE.

1,083,673.      Specification of Letters Patent.      Patented Jan. 6, 1914.

Application filed March 12, 1913. Serial No. 753,720.

*To all whom it may concern:*

Be it known that I, RUSSELL SCOTT ELLIS, a citizen of the United States, residing at Philadelphia, in the State of Pennsylvania, have invented a certain new and useful Improvement in Internal-Combustion Engines, whereof the following is a specification, reference being had to the accompanying drawing.

My invention is designed to facilitate the combustion of liquid hydrocarbons in internal combustion automobile engines when the latter are subjected to subnormal temperatures which tend to retard and minimize such combustion.

The object of my invention is to provide simple and effective means for heating both the air and fuel supplied to an automobile engine, to the temperature required for most effective combustion, despite the adverse atmospheric conditions aforesaid; such means being attachable and detachable as an accessory to automobiles of ordinary construction.

My invention includes the various novel features of construction and arrangement hereinafter more definitely specified.

In the drawing; Figure I is a diagrammatic plan view of an automobile engine and appurtenances in accordance with my invention. Fig. II is a longitudinal sectional view of the air heater shown in Fig. I, taken on the line II, II in Figs. I and III. Fig. III is a transverse sectional view of said air heater taken on the line III, III in Figs. I and II. Fig. IV is a longitudinal sectional view taken on the line IV, IV in Figs. I and V. Fig. V is a transverse sectional view taken on the line V, V in Figs. I and IV. Fig. VI is a plan view of the spider frame shown in section in Figs. II and III.

In said figures; 1 indicates an internal combustion engine of an automobile, including the twin cylinders 2 and 3 and having the air intake conduit 4, the exhaust outlet conduit 5, provided with a muffler at its end, the fuel inlet conduit 6 and the carbureter 7. The detachable air heater 10 in said exhaust conduit 5 includes the casing 11 having the axially alined tubular extensions 12 and 13 fitted to receive said exhaust conduit 5 and having between said extensions the chamber 15 of larger diameter than said conduit. The retort 16 in said air heater chamber 15 includes an annular tube concentric with the axis of said conduit 5 and casing 11, having the cold air inlet 18 opening through said casing at the upper side thereof and the hot air outlet 19 at the lower side thereof, in detachable connection with said air intake conduit 4. The spider frame 21 is detachably secured on said cold air inlet 18, conveniently by the set screw 22, and supports the cowl 24, covering said cold air inlet 18; said cowl being secured to said spider frame by the screws 25 engaging the openings 26 in said frame. Said cowl serves as a shield to prevent admission of rain or snow to said cold air inlet. The detachable fuel heater 28 in said air intake conduit 4 includes the casing 29 having axially alined tubular extensions 30 and 31 fitted to receive said air intake conduit 4 and having between said extensions the air chamber 34 of larger diameter than said conduit. The retort 35 in said air chamber includes a hollow drum extending from side to side thereof and having the flue tubes 37 extending therethrough parallel with the axis of said conduit 4 and tubular extensions 30 and 31.

As shown in Fig. V the cold fuel inlet 40 extends through said fuel heater casing into the chamber 41 in said drum surrounding said flue tubes 37, and the hot fuel outlet 42 extends from said drum chamber 41 through said fuel heater casing. As shown in Fig. I said cold fuel inlet 40 of the fuel heater 28 is connected with the fuel oil reservoir 45 by one section of the fuel inlet conduit 6; the other section of said conduit 6 connecting said hot fuel outlet 42 with said carbureter 7. Said retort drum 35 is conveniently provided with the drip outlet 47 leading to the atmosphere and controlled by the cock 48.

It may be observed that the construction and arrangement above described is such that the air supplied to the engine 1 through said air intake conduit 4 is first heated in said air heater 10 by the exhaust products of combustion flowing from said engine through the exhaust outlet conduit 5, and then heats the fuel in said fuel heater 28, before passing to the engine; the fuel being heated in said fuel heater, by said air in the conduit 4, while said fuel is on its way to the engine through the conduit 6.

Although I have shown the air heater 10 with smoothly cylindrical extensions 12 and 13 adapted to slip over the axially alined sections of said exhaust outlet conduit 5; and have also shown the fuel heater 28 with smoothly cylindrical extensions 30 and 31 adapted to slip over the axially alined sections of the air intake conduit 4; because I find such construction and arrangement may be conveniently employed in applying my invention as an accessory to some automobiles of ordinary construction; it is to be understood that other means may be employed for detachably connecting said heaters with their respective conduits. Moreover, although I have indicated the fuel heater 28, remote from the carbureter 7, for convenience of illustration, I find it preferable to locate said heater immediately adjoining the carbureter so as to minimize the loss of heat from the fuel during its passage from said heater to the carbureter.

I do not desire to limit myself to the precise details of construction and arrangement herein set forth, as it is obvious that various modifications may be made therein without departing from the essential features of my invention as defined in the appended claims.

I claim:—

1. In an automobile, the combination with an internal combustion engine having an air intake conduit, an exhaust outlet conduit, a fuel inlet conduit and a carbureter; of a detachable air heater fitting in said exhaust conduit, including a casing having axially alined tubular extensions fitted to receive said exhaust conduit and having between said extensions a chamber of larger diameter than said conduit; a retort in said chamber including an annular tube concentric with the axis of said conduit and casing and having a cold air inlet opening through said casing at the upper side thereof, and a hot air outlet at the lower side thereof; a spider frame on said cold air inlet; a cowl, supported by said spider frame, covering said cold air inlet; a detachable fuel heater fitting in said air intake conduit, including a casing having axially alined tubular extensions fitted to receive said air intake conduit and having between said extensions a chamber of larger diameter than said conduit; a retort in said chamber including a hollow drum extending from side to side thereof and having tubes extending therethrough parallel with the axis of said conduit and tubular extensions; a cold fuel inlet extending through said fuel heater casing into said drum; a hot fuel outlet extending from said drum through said casing; a drip outlet from said drum, leading to the atmosphere; means connecting said hot air outlet of said air heater with said fuel heater casing, and connecting the latter with said air intake of the engine; means connecting said cold fuel inlet of said fuel heater drum with a fuel reservoir, and means connecting said hot fuel outlet of said drum with said carbureter; whereby, the air supplied to the engine through said air intake conduit, is first heated in said air heater, by the exhaust products of combustion from the engine, and then heats the fuel in said fuel heater before passing to the engine, and the fuel is heated in said fuel heater, by said air, on its way to the engine.

2. In an automobile, the combination with an internal combustion engine having an air intake conduit, an exhaust outlet conduit, a fuel inlet conduit and a carbureter; of a detachable air heater fitting in said exhaust conduit, including a casing having tubular extensions fitted to receive said exhaust conduit and having a chamber; a retort in said chamber having a cold air inlet opening through said casing, and a hot air outlet through said casing; a cowl, covering said cold air inlet; a detachable fuel heater fitting in said air intake conduit, including a casing having tubular extensions fitted to receive said air intake conduit and having a chamber; a retort in said chamber including a hollow drum with tubes extending therethrough parallel with the axis of said conduit and tubular extensions; a cold fuel inlet extending through said fuel heater casing into said drum; a hot fuel outlet extending from said drum through said casing; a drip outlet from said drum, leading to the atmosphere; means connecting said hot air outlet of said air heater with said fuel heater casing, and connecting the latter with said air intake of the engine; means connecting said cold fuel inlet of said fuel heater drum with a fuel reservoir, and means connecting said hot fuel outlet of said drum with said carbureter; whereby, the air supplied to the engine through said air intake conduit, is first heated in said air heater, by the exhaust products of combustion from the engine, and then heats the fuel in said fuel heater before passing to the engine, and the fuel is heated in said fuel heater, by said air, on its way to the engine.

3. The combination with an internal combustion engine having an air intake conduit, an exhaust outlet conduit, a fuel inlet conduit and a carbureter; of an air heater fitting in said exhaust conduit, including a casing having a chamber; an air retort in said chamber including an annular tube concentric with the axis of said conduit and casing and having a cold air inlet and a hot air outlet; a fuel heater fitting in said air intake conduit, including a casing having a chamber; a fuel retort in said chamber; a cold fuel inlet extending through said fuel heater casing into said fuel retort; a hot fuel outlet extending from said fuel retort through said casing; means connecting said hot air outlet of said air heater with said fuel heater casing, and connecting the latter with said air intake of the engine; means connecting said cold fuel inlet of said fuel retort with a fuel reservoir, and means connecting said hot fuel outlet of said fuel retort with said carbureter; whereby, the air supplied to the engine through said air intake conduit, is first heated in said air heater, by the exhaust products of combustion from the engine, and then heats the fuel in said fuel heater before passing to the engine, and the fuel is heated in said fuel heater, by said air, on its way to the engine.

4. The combination with an internal combustion engine having an air intake conduit, an exhaust outlet conduit, a fuel inlet conduit, and a carbureter; of a detachable air heater fitting in said exhaust conduit, including a casing having tubular extensions fitted to receive said exhaust conduit and having a chamber through which the exhaust products of combustion pass; an air retort in said chamber, having a cold air inlet through said casing, and a hot air outlet through said casing; a detachable fuel heater fitting in said air intake conduit, including a casing having tubular extensions fitted to receive said air intake conduit, and having a chamber through which passes the hot air from said other heater; a fuel retort in said chamber having a cold fuel inlet through said casing, and a hot fuel outlet through said casing; means connecting said hot air outlet of said air heater with said fuel heater casing, and connecting the latter with said air intake of the engine; means connecting said cold fuel inlet of said fuel heater with a fuel reservoir, and means connecting said hot fuel outlet of said fuel heater with said carbureter; whereby, the air supplied to the engine through said air intake conduit, is first heated in said air heater, by the exhaust products of combustion from said engine, and then heats the fuel in said fuel heater before passing to the engine, and the fuel is heated in said fuel heater, by said air, before passing to the engine.

5. The combination with an internal combustion engine having an air intake conduit, an exhaust outlet conduit, a fuel inlet conduit, and a carbureter; of an air heater fitting in said exhaust conduit, having a chamber through which the exhaust products of combustion pass; an air retort in said chamber, having a cold air inlet and a hot air outlet; a fuel heater fitting in said air intake conduit, having a chamber through which passes the hot air from said other heater; a fuel retort in said chamber having a cold fuel inlet and a hot fuel outlet; means connecting said hot air outlet of said air heater with said fuel heater casing, and connecting the latter with said air intake of the engine; means connecting said cold fuel inlet of said fuel heater with a fuel reservoir, and means connecting said hot fuel outlet of said fuel heater with said carbureter; whereby, the air supplied to the engine through said air intake conduit, is first heated in said air heater, by the exhaust products of combustion from said engine, and then heats the fuel in said fuel heater before passing to the engine, and the fuel is heated in said fuel heater, by said air, before passing to the engine.

6. The combination with an internal combustion engine having an air intake conduit, an exhaust outlet conduit, a fuel inlet conduit and a carbureter; of a detachable fuel heater fitting in said air intake conduit, including a casing having axially alined tubular extensions fitted to receive said air intake conduit and having between said extensions a chamber of larger diameter than said conduit; a retort in said chamber including a hollow drum extending from side to side thereof and having tubes extending therethrough parallel with the axis of said conduit and tubular extensions; a cold fuel inlet extending through said fuel heater casing into said drum; a hot fuel outlet extending from said drum through said casing; a drip outlet from said drum, leading to the atmosphere; means connecting said hot air outlet of said air heater with said fuel heater casing, and connecting the latter with said air intake of the engine; means connecting said cold fuel inlet of said fuel heater drum with a fuel reservoir, and means connecting said hot fuel outlet of said drum with said carbureter; whereby, the fuel is heated in said fuel heater, on its way to the engine.

7. The combination with an internal combustion engine having an air intake conduit, an exhaust outlet conduit, a fuel inlet conduit and a carbureter; of an air heater in said exhaust conduit; a fuel heater in said air conduit; means connecting said air heater with said fuel heater and with the air intake of the engine; and means connecting said fuel heater with a fuel reservoir and with said carbureter; whereby, the air supplied to the engine through said air intake conduit, is first heated in said air heater, by the exhaust products of combustion from the engine, and then heats the fuel in said fuel heater before passing to the engine, and the fuel is heated in said fuel heater, by said air, on its way to the engine.

In testimony whereof, I have hereunto signed my name at Philadelphia, Pennsylvania, this eleventh day of March, 1913.

RUSSELL SCOTT ELLIS.

Witnesses:
JOHN A. QUILL,
HENRY H. OTTEUS.

Copies of this patent may be obtained for five cents each, by addressing the "Commissioner of Patents, Washington, D. C."